US012620299B2

(12) United States Patent
Aik Hooi et al.

(10) Patent No.: US 12,620,299 B2
(45) Date of Patent: May 5, 2026

(54) SERVER FAILURE PREDICTION USING MACHINE LEARNING

(71) Applicant: Dell Products L.P., Round Rock, TX (US)

(72) Inventors: Ooi Aik Hooi, Shah Alam (MY); Parminder Singh Sethi, Ludhiana (IN)

(73) Assignee: Dell Products L.P., Round Rock, TX (US)

( * ) Notice: Subject to any disclaimer, the term of this patent is extended or adjusted under 35 U.S.C. 154(b) by 229 days.

(21) Appl. No.: 18/523,217

(22) Filed: Nov. 29, 2023

(65) Prior Publication Data

US 2025/0174105 A1 May 29, 2025

(51) Int. Cl.
| | |
|---|---|
| *G08B 21/18* | (2006.01) |
| *G06F 11/00* | (2006.01) |
| *G06F 11/07* | (2006.01) |
| *G06F 11/34* | (2006.01) |

(52) U.S. Cl.
CPC .......... *G08B 21/182* (2013.01); *G06F 11/008* (2013.01); *G06F 11/0778* (2013.01); *G06F 11/0793* (2013.01); *G06F 11/3409* (2013.01)

(58) Field of Classification Search
CPC . G08B 21/182; G06F 11/008; G06F 11/0778; G06F 11/0793; G06F 11/3409
USPC ........................................ 340/540
See application file for complete search history.

(56) References Cited

U.S. PATENT DOCUMENTS

| | | | | |
|---|---|---|---|---|
| 10,613,962 | B1 * | 4/2020 | Delange | ................... G06N 7/01 |
| 12,242,361 | B1 * | 3/2025 | Jayasingh | ........... G06F 11/0709 |

| | | | | |
|---|---|---|---|---|
| 2019/0102244 | A1 * | 4/2019 | Tarlano | ............... G06F 11/0787 |
| 2020/0125465 | A1 * | 4/2020 | Choi | ....................... G06N 3/047 |
| 2020/0166921 | A1 * | 5/2020 | Lavid Ben Lulu | ........................... G05B 23/0294 |
| 2021/0357282 | A1 * | 11/2021 | Verma | .................... G06N 3/044 |
| 2022/0103444 | A1 * | 3/2022 | Ranjan | .................. H04L 43/106 |
| 2022/0327382 | A1 * | 10/2022 | Sexton | ..................... G06N 3/08 |
| 2023/0297412 | A1 | 9/2023 | Sethi et al. | |
| 2025/0053469 | A1 * | 2/2025 | Ayachitula | ............ G06F 11/004 |

OTHER PUBLICATIONS

J. Brownlee, "Time Series Forecasting With Prophet in Python," https://machinelearningmastery.com/time-series-forecasting-with-prophet-in-python/, Aug. 26, 2020, 33 pages.

(Continued)

*Primary Examiner* — Kerri L Mcnally

(74) *Attorney, Agent, or Firm* — Ryan, Mason & Lewis, LLP

(57) ABSTRACT

A method comprises collecting operational data corresponding to one or more servers, wherein the operational data comprises a plurality of values corresponding to at least one metric, and analyzing the operational data using one or more time series forecasting machine learning algorithms to predict a plurality of future values corresponding to the at least one metric. The plurality of the future values are compared to at least one threshold value for the at least one metric to determine whether at least a subset of the plurality of the future values satisfies one or more conditions associated with the at least one threshold value. An alert corresponding to operation of the one or more servers is automatically generated responsive to at least the subset of the plurality of the future values satisfying the one or more conditions. The alert is transmitted to at least one user device.

20 Claims, 7 Drawing Sheets

(56) References Cited

OTHER PUBLICATIONS

Prophet, "Forecasting at Scale," https://facebook.github.io/prophet/, Accessed Feb. 25, 2022, 4 pages.

* cited by examiner

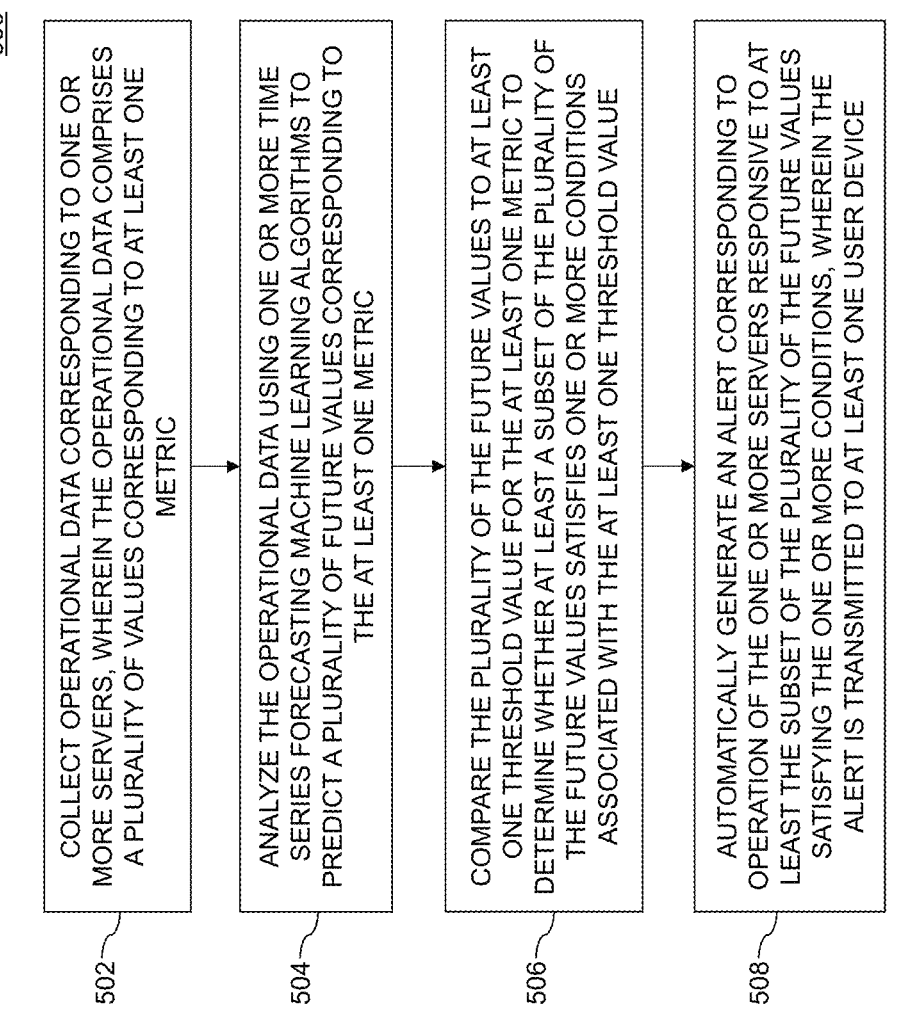

500

502 — COLLECT OPERATIONAL DATA CORRESPONDING TO ONE OR MORE SERVERS, WHEREIN THE OPERATIONAL DATA COMPRISES A PLURALITY OF VALUES CORRESPONDING TO AT LEAST ONE METRIC

504 — ANALYZE THE OPERATIONAL DATA USING ONE OR MORE TIME SERIES FORECASTING MACHINE LEARNING ALGORITHMS TO PREDICT A PLURALITY OF FUTURE VALUES CORRESPONDING TO THE AT LEAST ONE METRIC

506 — COMPARE THE PLURALITY OF THE FUTURE VALUES TO AT LEAST ONE THRESHOLD VALUE FOR THE AT LEAST ONE METRIC TO DETERMINE WHETHER AT LEAST A SUBSET OF THE PLURALITY OF THE FUTURE VALUES SATISFIES ONE OR MORE CONDITIONS ASSOCIATED WITH THE AT LEAST ONE THRESHOLD VALUE

508 — AUTOMATICALLY GENERATE AN ALERT CORRESPONDING TO OPERATION OF THE ONE OR MORE SERVERS RESPONSIVE TO AT LEAST THE SUBSET OF THE PLURALITY OF THE FUTURE VALUES SATISFYING THE ONE OR MORE CONDITIONS, WHEREIN THE ALERT IS TRANSMITTED TO AT LEAST ONE USER DEVICE

FIG. 5

SERVER FAILURE PREDICTION USING MACHINE LEARNING

FIELD

The field relates generally to information processing systems, and more particularly to server management in such information processing systems.

BACKGROUND

Monitoring platforms for databases and other types of systems collect data corresponding to device operation. Current monitoring mechanisms are reactive to operational problems. As a result, alerts about device issues do not reach administrators or technical support personnel until after the occurrence of device failure or degradation. Additionally, current reactive monitoring mechanisms can result in false alerts or alerts that may not be able to be acted on because detected operational data can change in a short period of time. For example, once a notification reaches an administrator, detected values may no longer be visible in a system.

SUMMARY

Embodiments provide a failure prediction and resolution recommendation platform in an information processing system.

For example, in one embodiment, a method comprises collecting operational data corresponding to one or more servers, wherein the operational data comprises a plurality of values corresponding to at least one metric, and analyzing the operational data using one or more time series forecasting machine learning algorithms to predict a plurality of future values corresponding to the at least one metric. The plurality of the future values are compared to at least one threshold value for the at least one metric to determine whether at least a subset of the plurality of the future values satisfies one or more conditions associated with the at least one threshold value. An alert corresponding to operation of the one or more servers is automatically generated responsive to at least the subset of the plurality of the future values satisfying the one or more conditions. The alert is transmitted to at least one user device.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other features and advantages of embodiments described herein will become more apparent from the accompanying drawings and the following detailed description.

BRIEF DESCRIPTION OF THE DRAWINGS

FIG. 5 depicts a process for server failure prediction according to an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous, and a user device receives messages without any significant time delay. Of course, it should be understood that depending on the particular temporal nature of the system in which an embodiment is implemented, other appropriate timescales that provide at least contemporaneous performance and output can be achieved.

Figure 1:
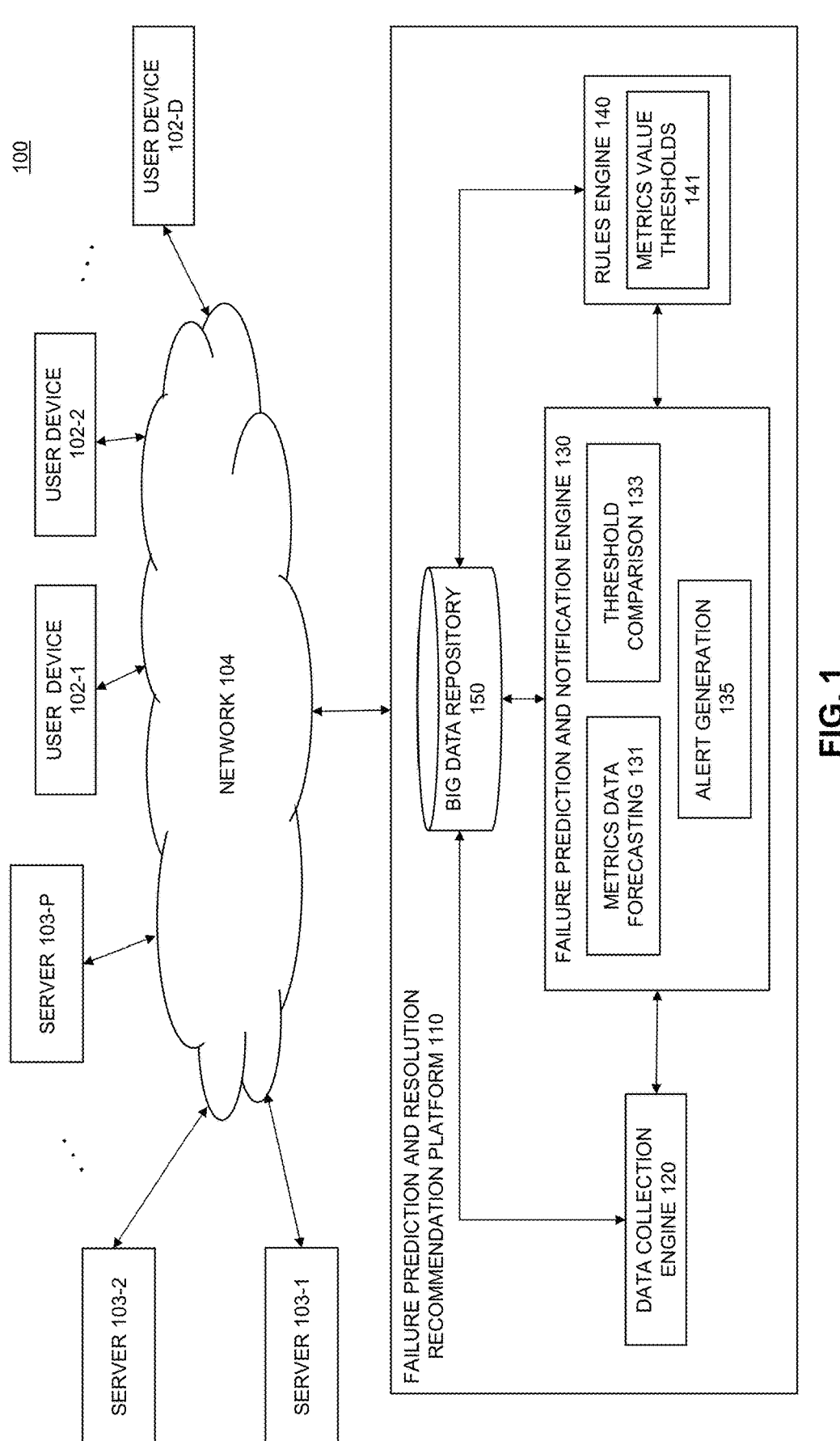
FIG. 1 depicts a failure prediction and resolution recommendation platform for predicting server failure and recommending remedial actions to avoid such failure in an illustrative embodiment.

FIG. 1 shows an information processing system 100 configured in accordance with an illustrative embodiment.

The information processing system 100 comprises user devices 102-1, 102-2, . . . 102-D (collectively "user devices 102") and servers 103-1, 103-2, . . . 103-P (collectively "servers 103"). The user devices 102 and servers 103 communicate over a network 104 with a failure prediction and resolution recommendation platform 110. The variables D and P and other similar index variables herein such as K and L are assumed to be arbitrary positive integers greater than or equal to one.

The user devices 102 and servers 103 can comprise, for example, desktop, laptop or tablet computers, servers, host devices, storage devices, mobile telephones, Internet of Things (IoT) devices or other types of processing devices capable of communicating with the failure prediction and resolution recommendation platform 110 over the network 104. Such devices are examples of what are more generally referred to herein as "processing devices." Some of these processing devices are also generally referred to herein as "computers." The user devices 102 and servers 103 may also or alternately comprise virtualized computing resources, such as virtual machines (VMs), containers, etc. The user devices 102 and/or servers 103 in some embodiments comprise respective computers associated with a particular company, organization or other enterprise. It is to be understood that although the embodiments are discussed in terms of user devices 102 (e.g., customer, client or administrator devices) and servers 103, the embodiments are not necessarily limited thereto, and may be applied to different devices (e.g., edge or cloud devices).

The terms "user," "customer," "client" or "administrator" herein are intended to be broadly construed so as to encompass numerous arrangements of human, hardware, software or firmware entities, as well as combinations of such entities. Failure prediction and resolution recommendation services may be provided for users utilizing one or more machine learning models, although it is to be appreciated that other types of infrastructure arrangements could be used. At least a portion of the available services and functionalities provided by the failure prediction and resolution recommendation platform 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the failure prediction and resolution recommendation platform 110, as well as to support communication between the failure prediction and resolution recommendation platform 110 and connected devices (e.g., user devices 102 and servers 103) and/or other related systems and devices not explicitly shown.

In some embodiments, the user devices 102 are assumed to be associated with repair and/or support technicians, system administrators, information technology (IT) managers, software developers, release management personnel or other authorized personnel configured to access and utilize the failure prediction and resolution recommendation platform 110.

As noted above, current monitoring mechanisms are reactive to operational problems such that alerts about device issues do not reach administrators or technical support personnel until after the occurrence of device failure or degradation.

In an effort to address the above technical problems, illustrative embodiments use machine learning techniques to predict server issues prior to server failure and to alert users with proposed corrective actions to avoid failure. Advantageously, live and historical server operational data including, for example, system information, logs, operating system (OS) and application data, is collected and analyzed using one or more machine learning algorithms. The illustrative embodiments provide a machine learning powered proactive approach to system monitoring that uses machine learning to predict potential outages and/or failures and automatically recommend a resolution. The embodiments advantageously implement a monitoring machine learning algorithm (MMA) to forecast and monitor events. The embodiments address and resolve problems caused by conventional reactive monitoring by introducing a proactive monitoring mechanism utilizing machine learning forecasting techniques. The machine learning model, for example, processes historical and/or live event and metrics data of corresponding systems to forecast future metrics values and trigger alerts to administrators and/or technical support personnel when the forecasted future values meet or exceed designated metrics thresholds or satisfy other types of conditions.

As used herein, "live data" refers to, for example, data corresponding to current (e.g., real-time) use of a device, system and/or component (e.g., server), and "historical data" refers to, for example, data corresponding to past use of a device, system and/or component.

The failure prediction and resolution recommendation platform 110 in the present embodiment is assumed to be accessible to the user devices 102 and servers 103 and vice versa over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Referring to FIG. 1, the failure prediction and resolution recommendation platform 110 includes a data collection engine 120, a failure prediction and notification engine 130, a rules engine 140 and a big data repository 150. The failure prediction and notification engine 130 comprises a metrics data forecasting layer 131, a threshold comparison layer 133 and an alert generation layer 135. The rules engine 140 comprises a metrics value thresholds layer 141.

Figure 2:
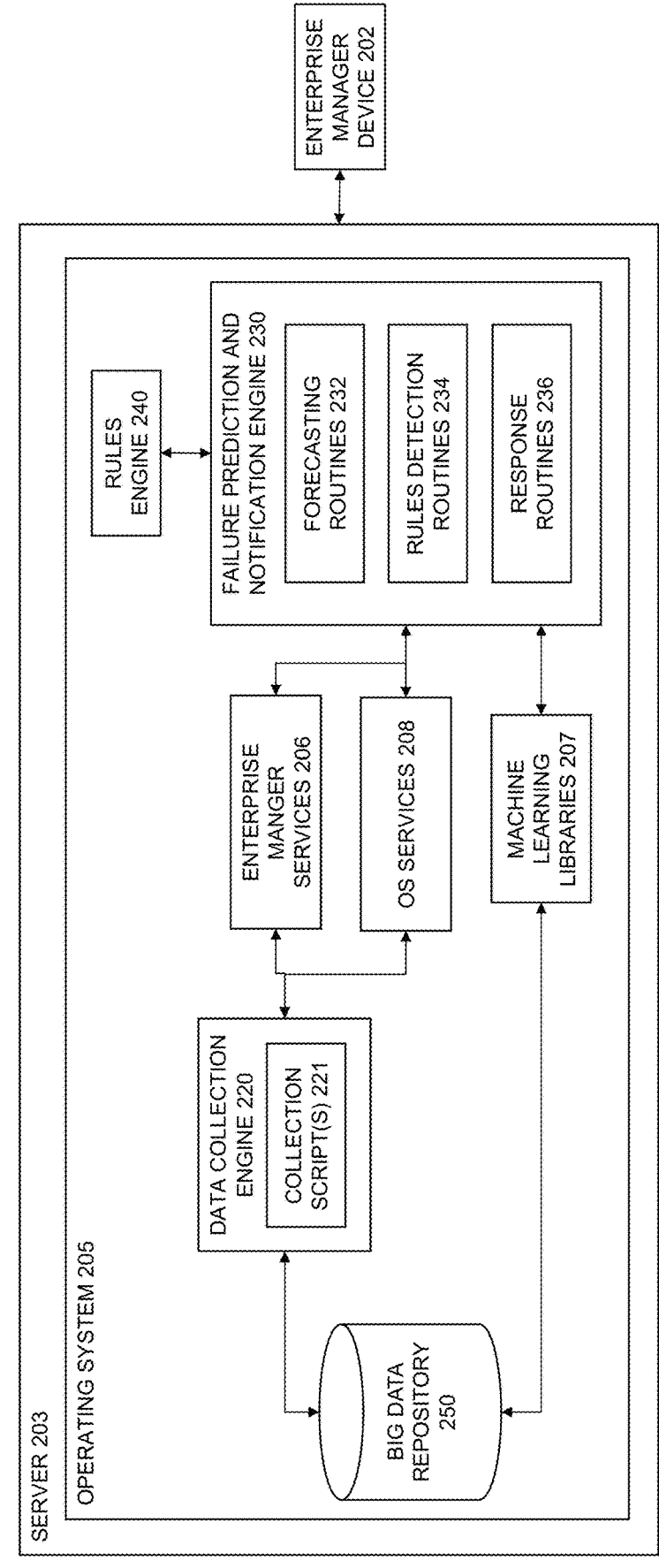
FIG. 2 depicts an architecture of a failure prediction and resolution recommendation platform on a server in an illustrative embodiment.

In the information processing system 100, the failure prediction and resolution recommendation platform 110 is connected to one or more servers 103 over network 104. Alternatively, as shown in the information processing system 200 of FIG. 2, the elements of a failure prediction and resolution recommendation platform (e.g., a data collection engine 220, a failure prediction and notification engine 230, a rules engine 240 and a big data repository 250) may be part of an operating system 205 of a server 203. The data collection engine 220, failure prediction and notification engine 230, rules engine 240 and big data repository 250 in FIG. 2 are the same as or similarly configured to the data collection engine 120, failure prediction and notification engine 130, rules engine 140 and big data repository 150 in FIG. 1.

The data collection engine 120 collects operational data corresponding to the operation of the servers 103 and components thereof. The data collection engine 220 collects operational data corresponding to the operation of the server 203 and components thereof. The data can be collected using one or more data collection applications (e.g., enterprise manager services 206) such as, but not necessarily limited to, SupportAssist Enterprise available from Dell Technologies. Referring to FIG. 2, the one or more data collection applications may run one or more collection scripts 221. The data collection engine 120/220 collects operational data from the servers 103/203. The collections may be, for example, continuous over designated time periods or scheduled collections at designated times (e.g., every 5 minutes, every 15 minutes, every 30 minutes, etc.). Scheduled collections occur at pre-defined times or intervals specified by, for example, a user via one or more user devices 102 or automatically scheduled by the data collection engine 120/220 through the one or more collection scripts 221. In some embodiments, an integrated Dell® remote access controller (iDRAC) causes the data collection engine 120/220 to collect operational data from one or more servers 103/203 and export the collected operational data to the big data repository 150/250 or to a shared network location (e.g., centralized database). In some embodiments, the operational data comprises performance metric values (e.g., values for input-output operations per second (IOPS), throughput, network latency, central processing unit (CPU) utilization, memory utilization, storage utilization, bandwidth, and/or replication lag time (e.g., replication lag time for logs or other data elements). An example metric value includes, for example, log replication lag time in seconds, which can be collected and stored at a frequency of, for example, every 5 minutes. The operational data collected by the data collection engine 120/200 may also include, but is not necessarily limited to, log data (e.g., server iDRAC logs, OS event logs, storage logs), server hardware configuration data and application data. The data collection engine 120/220 collects live and historical data.

In a non-limiting operational example, a database server (e.g., one of the servers 103/203) hosts multiple database services (e.g., OS services 208) corresponding to, for example, connectivity, cluster load balancing, replication, diagnostics, input/output (I/O) operations, CPU usage and memory usage. The database services operate in tandem to provide the best performance and a seamless user experience. A lack of synchronization between the services and/or problems with one or more of the services can potentially cause detrimental effects on server behavior, which may result in an outage.

The data collection engine 120/220 collects metrics into, for example, the big data repository 150/250 over a designated time period. In more detail, servers 103/203 (e.g., database servers) will respectively yield metrics data such as, but not necessarily limited to, CPU utilization, disk utilization, replication lag time, etc., which will be collected by the data collection engine 120/220 and stored in the big data repository 150/250. Over time, the metrics data will encompass a historical data set that will be used to train the machine learning models, forecast future metrics values and generate appropriate resolution recommendations.

The data collected from the data collection engine 120/220 is input to the failure prediction and notification engine 130/230 and to the big data repository 150/250. The data, which includes real-time data, is collected and monitored periodically for decision making and maintains information about the servers 103/203 in a centralized location (e.g., big data repository 150).

The failure prediction and notification engine 130/230 analyzes the operational data using one or more time series forecasting machine learning algorithms to predict a plurality of future values corresponding to the at least one metric. For example, the metrics data forecasting layer 131 executes one or more forecasting routines (e.g., forecasting routines 232) to analyze the collected operational data using one or more time series forecasting machine learning algorithms. For example, the machine learning model predicts future values of performance metrics based on historical operational data of a server 103/203 inputted to the failure prediction and notification engine 130/230 from the big data repository 150/250. The historical operational data can be over a predetermined historical time period (e.g., over the last week, month, 3 months, 6 months, year or other time period). This machine learning model predicts the performance metric values (e.g., values for IOPS, throughput, network latency, CPU utilization, memory utilization, storage utilization, bandwidth and/or replication lag time) for a given datacenter device (e.g., server 103/203) for an upcoming time period (e.g., the next 30 minutes, 45 minutes, hour, 6 hours, 12 hours, 24 hours, 48 hours, 72 hours, week, etc.).

The machine learning model is robust to missing data and shifts in trends, and is configured to handle outliers. This machine learning model facilitates forecasting of time series data based on an additive model where non-linear trends are fit with, for example, yearly, weekly, and daily seasonality, as well as holiday effects. The machine learning model is configured to automatically find a set of hyperparameters for the model for making data forecasts with trends and seasonal structure. The machine learning model is used to predict the performance metric values of the servers 103/203. In a non-limiting example, the machine learning model is based at least in part on the Prophet algorithm, which is an open-source time series forecasting model.

The machine learning algorithm leverages a logistic growth trend machine learning model to process historical data from the big data repository 150/250. Predictions based on larger samplings of historical data can be more accurate than predictions based on smaller samplings of historical data. Cumulative operational data over a period of time is processed and forecasts comprising future metric values are generated by the machine learning model using a logistic growth function (1).

$$p = f(a + bx) \tag{1}$$

where x is an explanatory variable, a and b are model parameters (e.g., hyperparameters) to be fitted, and f is the logistic function.

The threshold comparison layer 133 uses one or more rules detection routines (e.g., rules detection routines 234) to compare a plurality of future metric values generated by the metrics data forecasting layer 131 to at least one threshold value for at least one metric to determine whether at least a subset of the plurality of the future metric values satisfies one or more conditions associated with the at least one threshold value. For example, the rules engine 140/240, more particularly, metrics value thresholds layer 141, comprises a set of metrics value thresholds which are designated as pre-requisite conditions for decision-making processes. A non-limiting example of a metrics value threshold is a replication lag time of longer than 80 seconds indicating an issue. The failure prediction and notification engine 130/230 utilizes logistic regression machine learning to forecast metric data trends based on the historical data from big data repository 150/250. The forecasted data is compared to one or more designated metrics thresholds, and responsive to at least a subset of the forecasted values meeting or exceeding the one or more designated metrics thresholds, an alert corresponding to operation of one or more servers 103/203 will be automatically triggered. The alert is transmitted to at least one user device 102 associated with an administrator or technical support personnel (e.g., an enterprise manager device 202). An enterprise manager device 202 executes enterprise monitoring and management software for management and control of enterprise systems such as, for example, databases and/or datacenters. If the forecasted data is determined not to violate designated thresholds or other rules, no alert is triggered.

Figure 3:
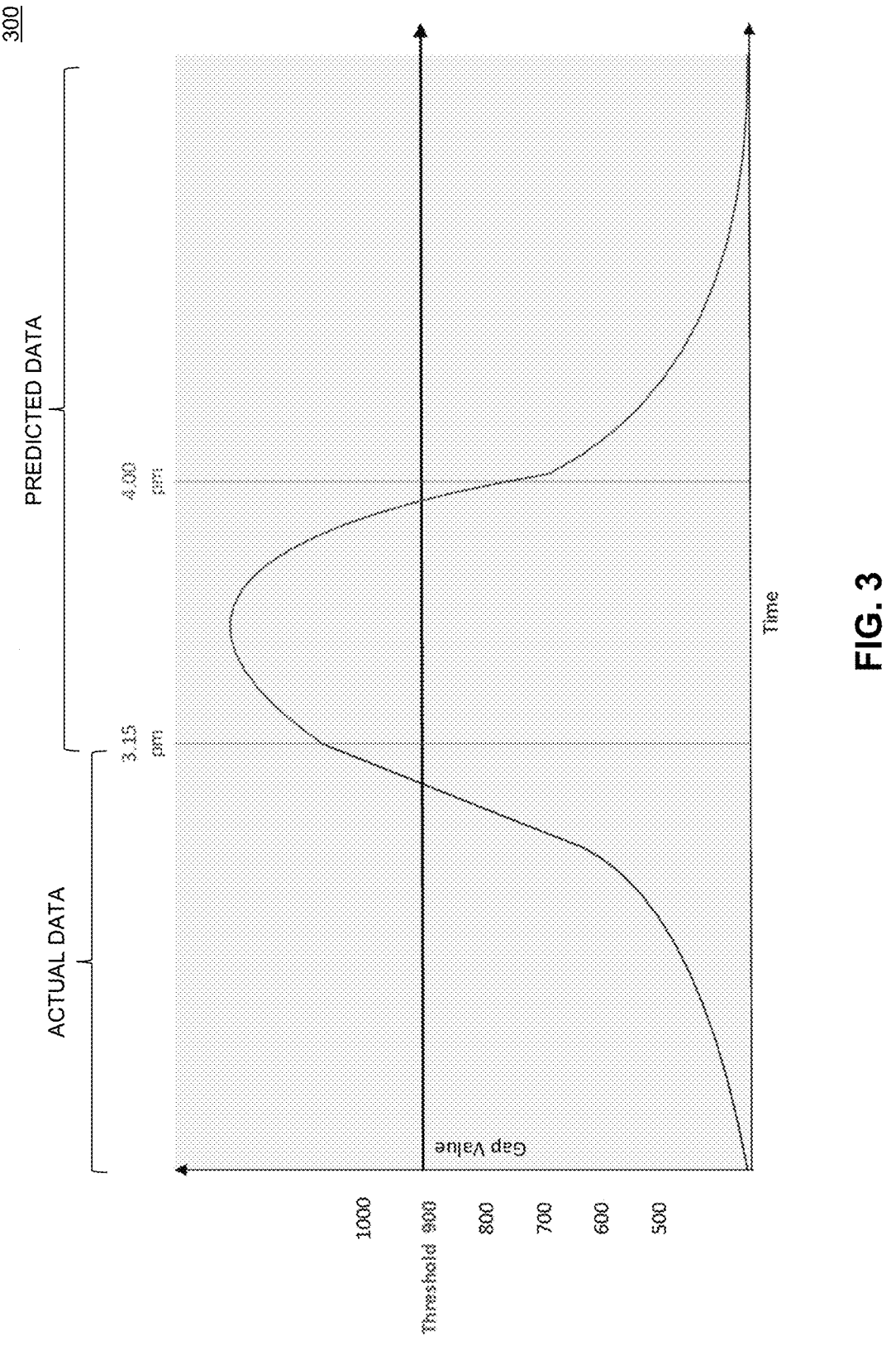
FIG. 3 depicts a first graph illustrating plots of actual and predicted operational data with respect to a designated threshold for triggering an alert in an illustrative embodiment.
Figure 4:
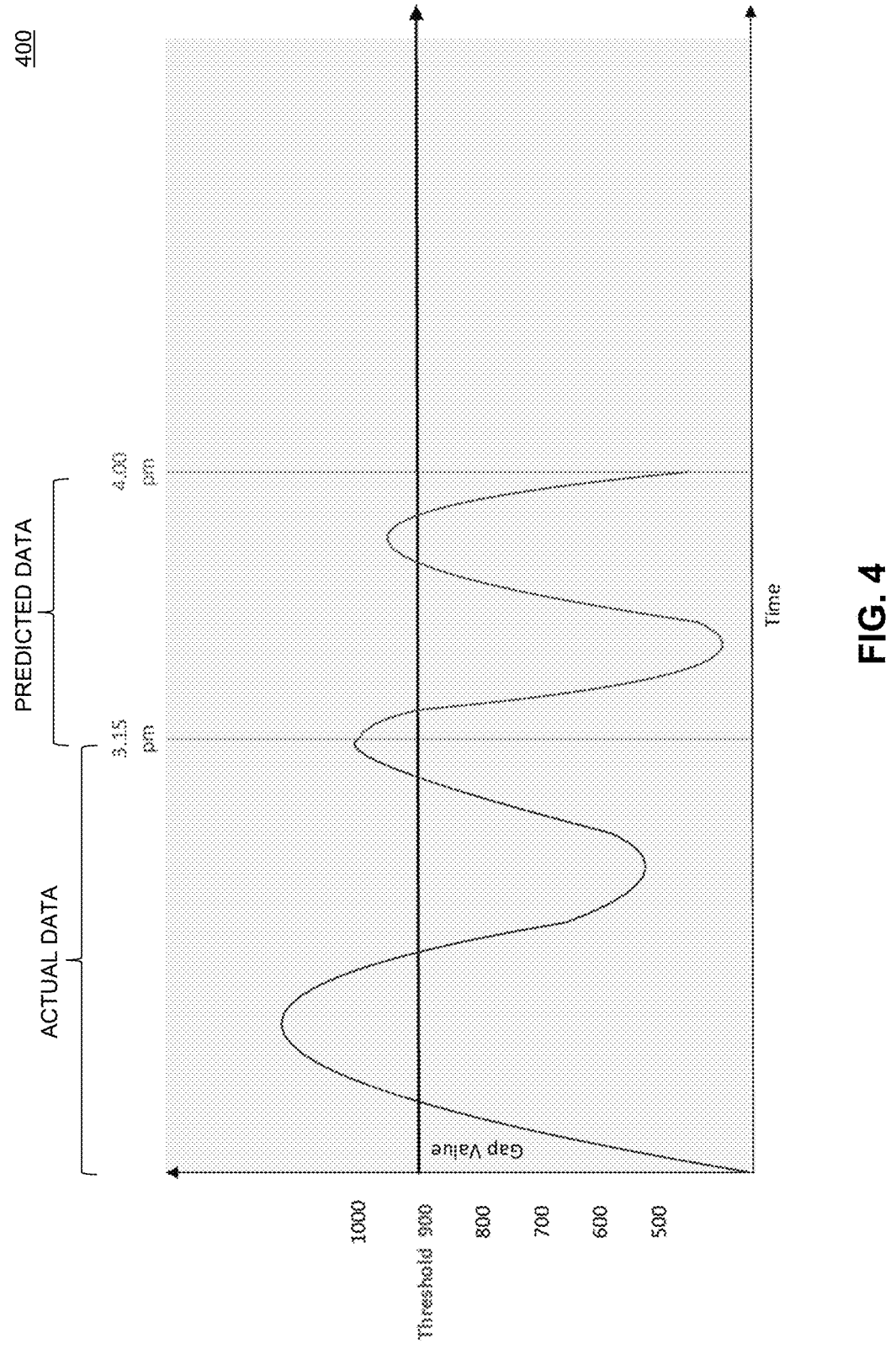
FIG. 4 depicts a second graph illustrating plots of actual and predicted operational data with respect to a designated threshold for triggering an alert in an illustrative embodiment.

In illustrative embodiments, the graphs 300 and 400 in FIGS. 3 and 4 illustrate logarithmic curves of actual and predicted metric values with respect to a designated threshold for triggering an alert. The logarithmic curves may be generated by the metrics data forecasting layer 131. As can be seen in the graph 300, the metric values for the actual data curve increase over time until the threshold metric value is exceeded. In the graph 300, the predicted data curve depicts a continued trend for increases in predicted metric values until a peak value is reached, and then depicts a trend for decreases in predicted metric values over a remaining time period. During the given time period of 3:15 pm to 4:00 pm, the predicted metric values are greater than the threshold metric value. In the graph 400, the metric values for the actual data curve vary over time such that metric values vary between being less than and greater than the threshold metric value. In the graph 400, the predicted data curve depicts a trend for predicted metric values less than the threshold metric value for a given time period (e.g., 3:15 pm to 4:00 pm).

Using one or more forecasting routines 232, the metrics data forecasting layer 131 generates a first logarithmic curve corresponding to a plurality of metric values over a past time period and generates a second logarithmic curve corresponding to a plurality of future metric values over a future time period. The performance metric may be any of the performance metrics noted herein (e.g., IOPS, throughput, network latency, CPU utilization, memory utilization, storage utilization, bandwidth and/or replication lag time) and the metrics data forecasting layer 131 may generate multiple curves for multiple performance metrics. Using one or more rules detection routines 234, the threshold comparison layer 133 identifies differences (e.g., gap values) between the second logarithmic curve and the threshold metric value for a given time period (e.g., 3:15 pm to 4:00 pm). If a condition is satisfied for the given time period, the alert generation layer 135 uses a response routine (e.g., response routines 236) to automatically generate an alert to an administrator corresponding to operation of the one or more servers. For example, assuming a condition from the rules engine 140/240 which states that an alert must be generated if an entire or a majority of a logarithmic curve for predicted values in a given time period exceeds a threshold metric value, then the alert generation layer 135 will automatically generate an alert which may identify, for example, at least one potential issue with the one or more servers 103/203 and at least one remedial action to address the at least one potential issue. The potential issue and remedial action may be defined in one or more rules from the rules engine.

As can be understood, for a given time period, the threshold comparison layer 133 determines whether a subset of a plurality of future metric values (e.g., a grouping of the plurality of future values over a designated time period) satisfies a given rule. The given rule may require, for example, that for an alert to be triggered, a majority of a data pattern (e.g., logarithmic curve) generated by the grouping of the plurality of future values over the designated time period meets and/or exceeds the threshold metric value. Depending on the nature of the metric, an alert may alternatively be triggered if the majority of a data pattern generated by the grouping of the plurality of future values over the designated time period meets and/or is less than the threshold metric value.

Referring to graphs 300 and 400, by analyzing the data trends of past occurrences (e.g., replication lag time occurrences in an operational example) from the big data repository 150/250 (actual data), a logistic growth machine learning model generates a plot of predicted data trends (predicted data) to allow decision making to occur based on the predefined rules (e.g., thresholds) from the rules engine 140/240 described herein above.

In connection with the operation of the failure prediction and notification engine 130, the machine learning models used by the metrics data forecasting layer 131 may import one or more machine learning libraries 207 to implement the failure prediction and notification engine 130. For example, Python, ScikitLearn, Pandas and Numpy libraries can be used. Some embodiments may implement classification using a neural network with Tensorflow® and/or Keras libraries.

According to one or more embodiments, the big data repository 150/250 and other data repositories or databases referred to herein can be configured according to a relational database management system (RDBMS) (e.g., PostgreSQL). In some embodiments, the big data repository 150/250 and other data repositories or databases referred to herein are implemented using one or more storage systems or devices associated with the failure prediction and resolution recommendation platform 110. In some embodiments, one or more of the storage systems utilized to implement the big data repository 150 and other data repositories or databases referred to herein comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the failure prediction and resolution recommendation platform 110, the data collection engine 120, failure prediction and notification engine 130, rules engine 140 and/or big data repository 150 in other embodiments can be implemented at least in part externally to the failure prediction and resolution recommendation platform 110, for example, as stand-alone servers, sets of servers or other types of systems coupled to the network 104. For example, the data collection engine 120, failure prediction and notification engine 130, rules engine 140 and/or big data repository 150 may be provided as cloud services accessible by the failure prediction and resolution recommendation platform 110.

The data collection engine 120/220, failure prediction and notification engine 130/230, rules engine 140/240 and/or big data repository 150/250 in the FIG. 1 and FIG. 2 embodiments are each assumed to be implemented using at least one processing device. Each such processing device generally comprises at least one processor and an associated memory, and implements one or more functional modules for controlling certain features of the data collection engine 120/220, failure prediction and notification engine 130/230, rules engine 140/240 and/or big data repository 150/250.

At least portions of the failure prediction and resolution recommendation platforms (including failure prediction and resolution recommendation platform 110) described herein and the elements thereof may be implemented at least in part in the form of software that is stored in memory and executed by a processor. The failure prediction and resolution recommendation platforms described herein and the elements thereof comprise further hardware and software required for running the failure prediction and resolution recommendation platforms, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the data collection engine 120, failure prediction and notification engine 130, rules engine 140, big data repository 150 and other elements of the failure prediction and resolution recommendation platform 110 in the present embodiment are shown as part of the failure prediction and resolution recommendation platform 110, at least a portion of the data collection engine 120, failure prediction and notification engine 130, rules engine 140, big data repository 150 and other elements of the failure prediction and resolution recommendation platform 110 in other embodiments may be implemented on one or more other processing platforms that are accessible to the failure prediction and resolution recommendation platform 110 over one or more networks. Such elements can each be implemented at least in part within another system element or at least in part utilizing one or more stand-alone elements coupled to the network 104.

It is assumed that the failure prediction and resolution recommendation platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the data collection engine 120/220, failure prediction and notification engine 130/230, rules engine 140/240, big data repository 150/250 and other elements of failure prediction and resolution recommendation platforms described herein, and the elements thereof can each be implemented in the form of one or more LXCs running on one or more VMs. Other arrangements of one or more processing devices of a processing platform can be used to implement the data collection engine 120/220, failure prediction and notification engine 130/230, rules engine 140/240 and big data repository 150/250, as well as other elements of the failure prediction and resolution recommendation platforms described herein. Other portions of the systems 100 and 200 can similarly be implemented using one or more processing devices of at least one processing platform.

Distributed implementations of the systems 100 and 200 are possible, in which certain elements of the systems reside in one data center in a first geographic location while other elements of the system reside in one or more other data centers in one or more other geographic locations that are potentially remote from the first geographic location. Thus, it is possible in some implementations of the systems 100 and 200 for different portions of the failure prediction and resolution recommendation platforms to reside in different data centers. Numerous other distributed implementations of the failure prediction and resolution recommendation platforms described herein are possible.

For example, one or each of the data collection engine 120, failure prediction and notification engine 130, rules engine 140, big data repository 150 and other elements of the failure prediction and resolution recommendation platform 110 can each be implemented in a distributed manner so as to comprise a plurality of distributed elements implemented on respective ones of a plurality of compute nodes of the failure prediction and resolution recommendation platform 110.

It is to be appreciated that these and other features of illustrative embodiments are presented by way of example only, and should not be construed as limiting in any way. Accordingly, different numbers, types and arrangements of system elements such as the data collection engine 120/220, failure prediction and notification engine 130/230, rules engine 140/240, big data repository 150/250 and other elements of the failure prediction and resolution recommendation platforms described herein, and the portions thereof can be used in other embodiments.

It should be understood that the particular sets of modules and other elements implemented in the systems 100 and 200 as illustrated in FIG. 1 and FIG. 2 are presented by way of example only. In other embodiments, only subsets of these elements, or additional or alternative sets of elements, may be used, and such elements may exhibit alternative functionality and configurations.

For example, as indicated previously, in some illustrative embodiments, functionality for the failure prediction and resolution recommendation platform can be offered to cloud infrastructure customers or other users as part of FaaS, CaaS and/or PaaS offerings.

The operation of the information processing systems 100 and/or 200 will now be described in further detail with reference to the flow diagram of FIG. 5. With reference to FIG. 5, a process 500 for failure prediction and resolution recommendation as shown includes steps 502 through 508, and is suitable for use in the system 100 and/or 200 but is more generally applicable to other types of information processing systems comprising a failure prediction and resolution recommendation platform configured for failure prediction and resolution recommendation.

In step 502, operational data corresponding to one or more servers is collected, wherein the operational data comprises a plurality of values corresponding to at least one metric. The at least one metric comprises at least one of IOPS, throughput, latency, CPU utilization, storage utilization, memory utilization, bandwidth and replication lag time. The operational data comprises historical data and/or live data.

In step 504, the operational data is analyzed using one or more time series forecasting machine learning algorithms to predict a plurality of future values corresponding to the at least one metric. The one or more time series forecasting machine learning algorithms may be based at least in part on a logistic growth function. The operational data that is analyzed by the one or more time series forecasting machine learning algorithms can be cumulative over a designated time period. The one or more time series forecasting machine learning algorithms are configured to automatically identify a set of hyperparameters for predicting the plurality of future values over a future time period.

In step 506, the plurality of the future values are compared to at least one threshold value for the at least one metric to determine whether at least a subset of the plurality of the future values satisfies one or more conditions associated with the at least one threshold value.

In step 508, an alert corresponding to operation of the one or more servers is automatically generated responsive to at least the subset of the plurality of the future values satisfying the one or more conditions, wherein the alert is transmitted to at least one user device. In an illustrative embodiment, the alert identifies at least one issue with the one or more servers and at least one remedial action to address the at least one issue.

In illustrative embodiments, the subset of the plurality of the future values comprises a grouping of the plurality of future values over a designated time period. The one or more conditions may comprise a majority of a data pattern generated by the grouping of the plurality of future values over the designated time period at least one of meeting and exceeding the at least one threshold value.

In illustrative embodiments, a first logarithmic curve corresponding to the plurality of values over a past time period is generated and a second logarithmic curve corresponding to the plurality of future values over a future time period is generated. The one or more conditions can correspond to differences between the second logarithmic curve and a line representing a constant value over the future time period, wherein the constant value is equal to the at least one threshold value.

It is to be appreciated that the FIG. 5 process and other features and functionality described above can be adapted for use with other types of information systems configured to execute failure prediction and resolution recommendation services in a failure prediction and resolution recommendation platform or other type of platform.

The particular processing operations and other system functionality described in conjunction with the flow diagram of FIG. 5 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 5 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with a failure prediction and resolution recommendation platform as disclosed herein can provide a number of significant advantages relative to conventional arrangements. For example, the failure prediction and resolution recommendation platform effectively uses machine learning techniques to predict server failure and/or performance degradation, which may lead to failure. Advantageously, the machine learning algorithm accurately predicts future data trends based on a time series data pattern captured in a big data repository. The embodiments provide a proactive forecasting mechanism to identify potential issues, thus eliminating reactive troubleshooting and manual intervention, thereby reducing cost of administration and improving user satisfaction due to reduced outages.

The embodiments advantageously use machine learning algorithms to evaluate operational data to forecast metric values. The embodiments provide techniques for the comparison of the forecasted metric values to designated metric value thresholds to determine whether administrators should be alerted about server issues. Unlike conventional techniques, the embodiments provide a framework for proactively predicting and alerting users of upcoming server failures by analyzing historical operational data and using machine learning models to predict future operational data trends. As an additional advantage, the embodiments permit live event data to be collected and accumulated in a big data repository while the prediction process is occurring. The live data collection enhances the accuracy of the machine learning predictions.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing systems 100 and 200 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system elements such as the failure prediction and resolution recommendation platform 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and a failure prediction and resolution recommendation platform in illustrative embodiments. These and other cloud-based systems in illustrative embodiments can include object stores.

Illustrative embodiments of processing platforms will now be described in greater detail with reference to FIGS. 6 and 7. Although described in the context of systems 100 and 200, these platforms may also be used to implement at least portions of other information processing systems in other embodiments.

Figure 6:
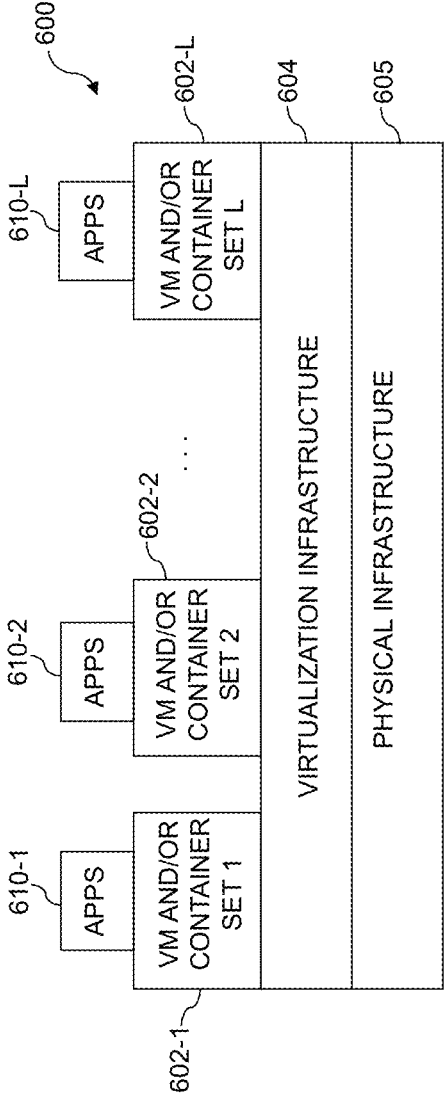
FIGS. 6 and 7 show examples of processing platforms that may be utilized to implement at least a portion of an information processing system according to illustrative embodiments.
Figure 7:
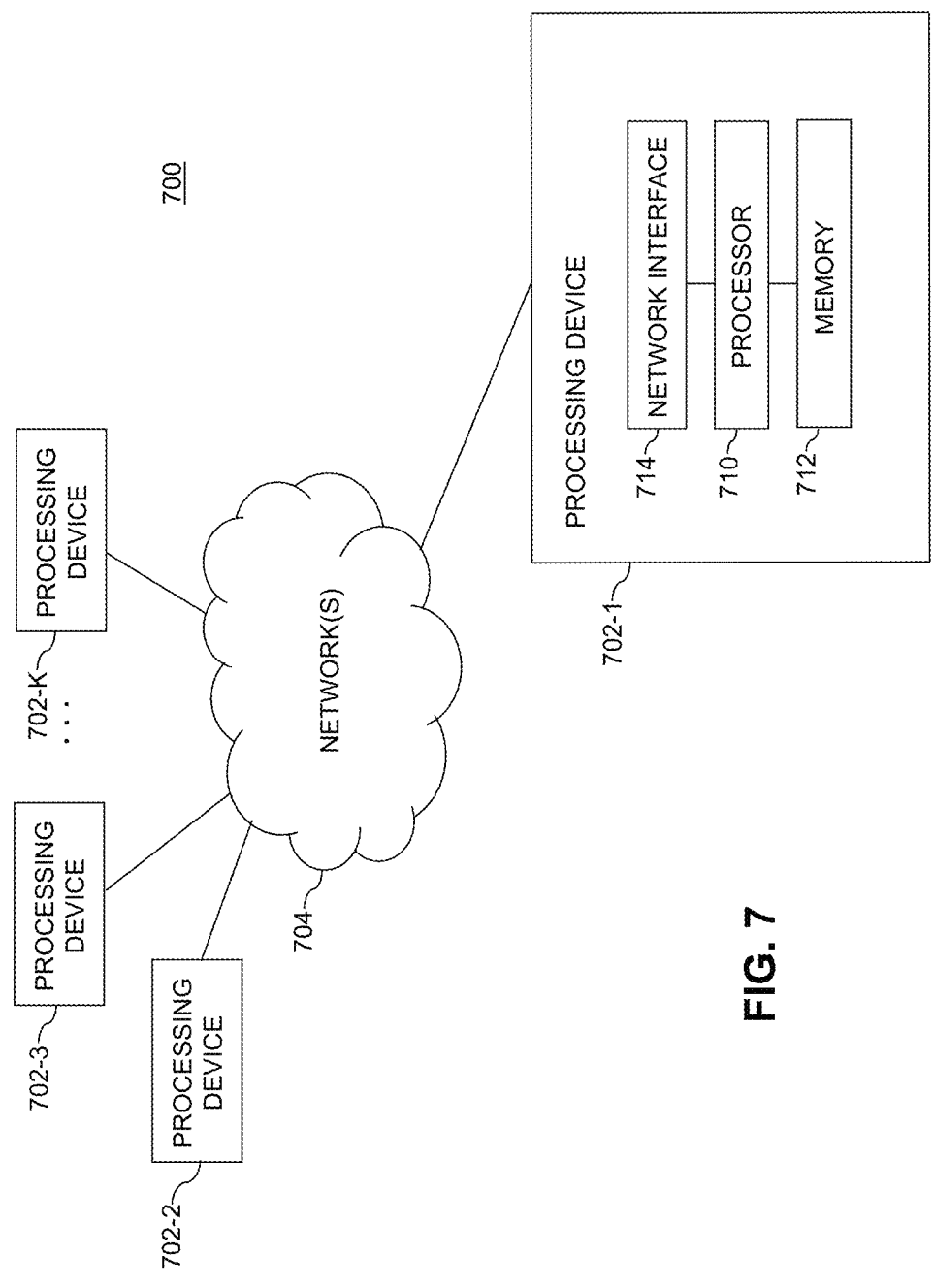

FIG. 6 shows an example processing platform comprising cloud infrastructure 600. The cloud infrastructure 600 comprises a combination of physical and virtual processing resources that may be utilized to implement at least a portion of the information processing systems 100 and 200. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. A hypervisor platform may be used to implement a hypervisor within the virtualization infrastructure 604, where the hypervisor platform has an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of systems 100 and 200 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712. The processor 710 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and systems 100 and 200 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more elements of the failure prediction and resolution recommendation platform 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and failure prediction and resolution recommendation platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
collecting operational data corresponding to one or more servers, wherein the operational data comprises a plurality of values corresponding to at least one metric;
analyzing the operational data using one or more time series forecasting machine learning algorithms to predict a plurality of future values corresponding to the at least one metric;
comparing the plurality of the future values to at least one threshold value for the at least one metric to determine whether at least a subset of the plurality of the future values satisfies one or more conditions associated with the at least one threshold value; and
automatically generating an alert corresponding to operation of the one or more servers responsive to at least the subset of the plurality of the future values satisfying the one or more conditions, wherein the alert is transmittable to at least one user device;
wherein the subset of the plurality of the future values comprises a grouping of the plurality of future values over a designated time period, and the one or more conditions comprises a data pattern generated by the grouping of the plurality of future values over the designated time period at least one of meeting and exceeding the at least one threshold value;
wherein the steps of the method are executed by a processing device operatively coupled to a memory.

2. The method of claim 1 wherein the alert identifies at least one issue with the one or more servers and at least one remedial action to address the at least one issue.

3. The method of claim 1 wherein the at least one metric comprises at least one of input-output operations per second, throughput, latency, central processing unit utilization, storage utilization, memory utilization, bandwidth and replication lag time.

4. The method of claim 1 wherein the operational data comprises historical data and live data.

5. The method of claim 1 wherein:
the one or more conditions comprises a majority of the data pattern generated by the grouping of the plurality of future values over the designated time period at least one of meeting and exceeding the at least one threshold value.

6. The method of claim 1 wherein the one or more time series forecasting machine learning algorithms are based at least in part on a logistic growth function.

7. The method of claim 1 wherein the operational data that is analyzed by the one or more time series forecasting machine learning algorithms is cumulative over a designated time period.

8. The method of claim 1 wherein the one or more time series forecasting machine learning algorithms are configured to automatically identify a set of hyperparameters for predicting the plurality of future values over a future time period.

9. The method of claim 1 further comprising generating a first logarithmic curve corresponding to the plurality of values over a past time period and generating a second logarithmic curve corresponding to the plurality of future values over a future time period.

10. The method of claim 9 wherein the one or more conditions correspond to differences between the second logarithmic curve and a line representing a constant value over the future time period, wherein the constant value is equal to the at least one threshold value.

11. An apparatus comprising:
a processing device operatively coupled to a memory and configured:
to collect operational data corresponding to one or more servers, wherein the operational data comprises a plurality of values corresponding to at least one metric;
to analyze the operational data using one or more time series forecasting machine learning algorithms to predict a plurality of future values corresponding to the at least one metric;
to compare the plurality of the future values to at least one threshold value for the at least one metric to determine whether at least a subset of the plurality of the future values satisfies one or more conditions associated with the at least one threshold value; and
to automatically generate an alert corresponding to operation of the one or more servers responsive to at least the subset of the plurality of the future values satisfying the one or more conditions, wherein the alert is transmittable to at least one user device;
wherein the subset of the plurality of the future values comprises a grouping of the plurality of future values over a designated time period, and the one or more conditions comprises a data pattern generated by the grouping of the plurality of future values over the designated time period at least one of meeting and exceeding the at least one threshold value.

12. The apparatus of claim 11 wherein:
the one or more conditions comprises a majority of the data pattern generated by the grouping of the plurality of future values over the designated time period at least one of meeting and exceeding the at least one threshold value.

13. The apparatus of claim 11 wherein the one or more time series forecasting machine learning algorithms are configured to automatically identify a set of hyperparameters for predicting the plurality of future values over a future time period.

14. The apparatus of claim 11 wherein the processing device is further configured to generate a first logarithmic curve corresponding to the plurality of values over a past time period and to generate a second logarithmic curve corresponding to the plurality of future values over a future time period.

15. The apparatus of claim 14 wherein the one or more conditions correspond to differences between the second logarithmic curve and a line representing a constant value over the future time period, wherein the constant value is equal to the at least one threshold value.

16. An article of manufacture comprising a non-transitory processor-readable storage medium having stored therein program code of one or more software programs, wherein the program code when executed by at least one processing device causes said at least one processing device to perform the steps of:

collecting operational data corresponding to one or more servers, wherein the operational data comprises a plurality of values corresponding to at least one metric;

analyzing the operational data using one or more time series forecasting machine learning algorithms to predict a plurality of future values corresponding to the at least one metric;

comparing the plurality of the future values to at least one threshold value for the at least one metric to determine whether at least a subset of the plurality of the future values satisfies one or more conditions associated with the at least one threshold value; and automatically generating an alert corresponding to operation of the one or more servers responsive to at least the subset of the plurality of the future values satisfying the one or more conditions, wherein the alert is transmittable to at least one user device;

wherein the subset of the plurality of the future values comprises a grouping of the plurality of future values over a designated time period, and the one or more conditions comprises a data pattern generated by the grouping of the plurality of future values over the designated time period at least one of meeting and exceeding the at least one threshold value.

17. The article of manufacture of claim 16 wherein:

the one or more conditions comprises a majority of the data pattern generated by the grouping of the plurality of future values over the designated time period at least one of meeting and exceeding the at least one threshold value.

18. The article of manufacture of claim 16 wherein the one or more time series forecasting machine learning algorithms are configured to automatically identify a set of hyperparameters for predicting the plurality of future values over a future time period.

19. The article of manufacture of claim 16 wherein the program code further causes said at least one processing device to perform the steps of generating a first logarithmic curve corresponding to the plurality of values over a past time period and generating a second logarithmic curve corresponding to the plurality of future values over a future time period.

20. The article of manufacture of claim 19 wherein the one or more conditions correspond to differences between the second logarithmic curve and a line representing a constant value over the future time period, wherein the constant value is equal to the at least one threshold value.

* * * * *